United States Patent [19]

Kent et al.

[11] Patent Number: 4,504,008
[45] Date of Patent: Mar. 12, 1985

[54] METHOD AND APPARATUS FOR REFLOWING SOLDER STRIPES ON ARTICLES

[75] Inventors: William C. Kent; Charles H. Payne, both of Garland, Tex.

[73] Assignee: AT&T Technologies, Inc., New York, N.Y.

[21] Appl. No.: 500,588

[22] Filed: Jun. 2, 1983

[51] Int. Cl.³ .......................... B23K 31/02; B23K 1/00
[52] U.S. Cl. .................................. 228/180.2; 228/200; 228/46; 228/47; 219/243; 219/85 R; 156/311; 432/226
[58] Field of Search .................... 228/46, 47, 191, 214, 228/240, 242, 264, 180 A, 200; 156/311, 498, 499, 538, 583.1, 583.4, 583.5; 432/153, 225, 226; 219/243

[56] References Cited

U.S. PATENT DOCUMENTS 3,166,462  1/1965  Schoder .............................. 156/311
3,698,619  10/1972  Jacquot et al. ...................... 228/46
3,941,292  3/1976  Osipov et al. ........................ 228/35
4,306,674  12/1981  Charles et al. ...................... 228/36

FOREIGN PATENT DOCUMENTS 026697  2/1980  Japan .................................. 228/47

Primary Examiner—Nicholas P. Godici
Assistant Examiner—Maureen Weikert
Attorney, Agent, or Firm—R. P. Miller; M. de Picciotto

[57] ABSTRACT

A conveyor 21 rapidly advances a series of workholders to move printed circuit board connectors 10 mounted therein along a short insulating rail section 37 and a second long cooled rail 31. Presoldered leads 13 overlaying contacts pads 14 are heated to temperatures slightly above the melting point of solder during movement along the first rail 28 and are cooled to solidify the solder during movement along the second rail. A belt 44, moving at the same speed as the conveyor, presses the boards to ensure good contact of the leads with the pads during the melting and cooling of the solder.

12 Claims, 4 Drawing Figures

U.S. Patent    Mar. 12, 1985    4,504,008
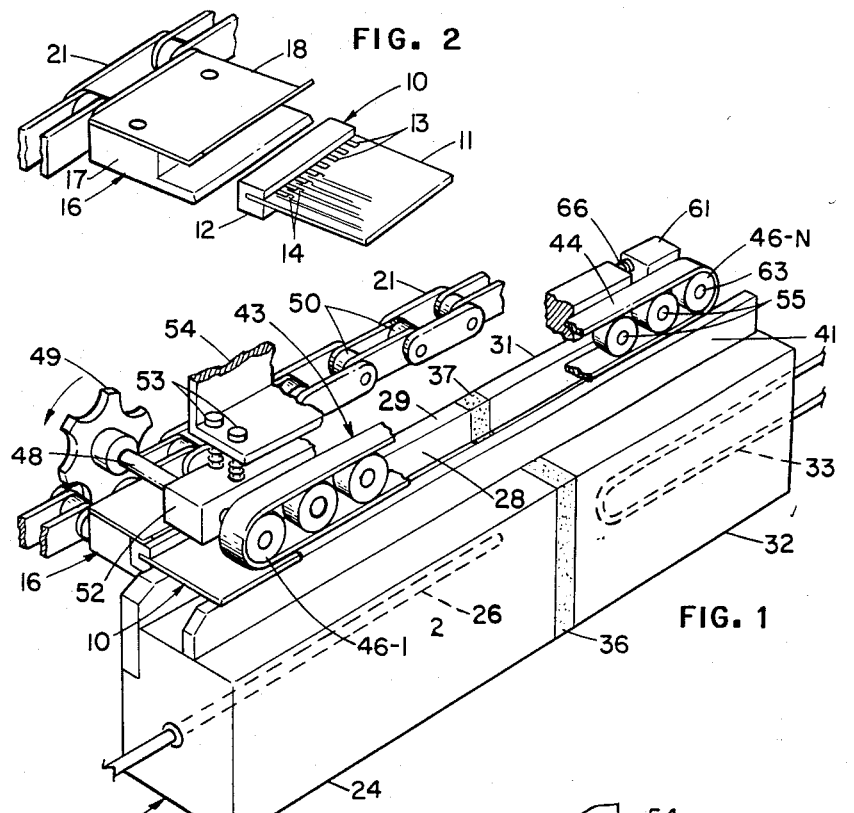
FIG. 2
FIG. 1
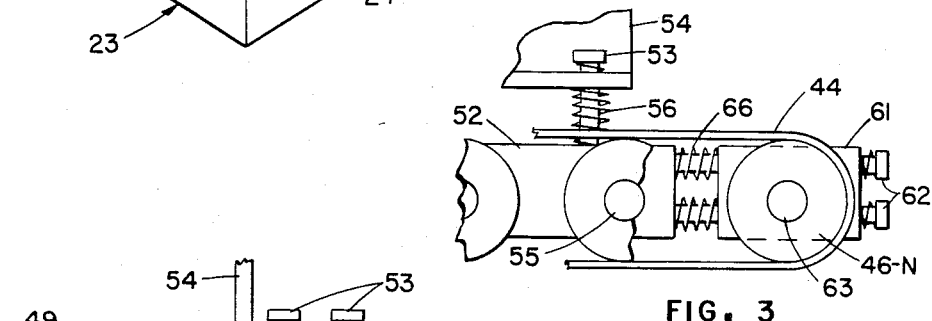
FIG. 3
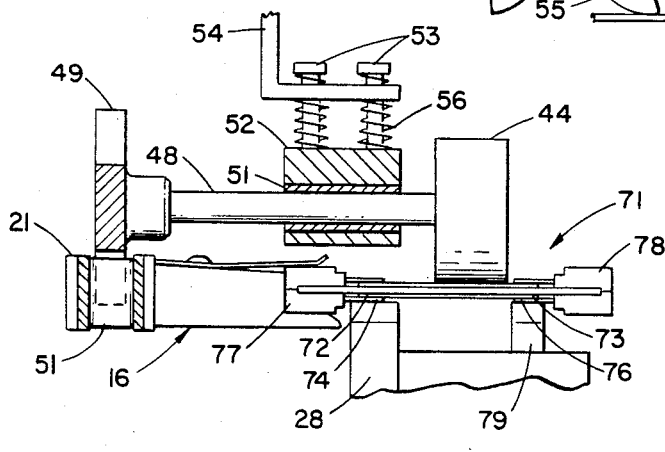
FIG. 4

METHOD AND APPARATUS FOR REFLOWING SOLDER STRIPES ON ARTICLES

FIELD OF THE INVENTION

This invention relates to methods and apparatus for rapidly advancing articles and reflowing continuous or interrupted stripes of solder on the articles, and more particularly, to a fast moving conveyor for moving presolder coated overlaying elements on articles such as a printed circuit board, along a heated bar and then along a cooling bar to solder bond the overlaying elements.

BACKGROUND OF INVENTION

In the manufacturing of many types of products, it is often necessary to reflow a predeposited stripe of solder to effectuate a bond between a base element and an overlaying element. This manufacturing requirement is often encountered in the production of printed circuit boards where presoldered leads arrayed in a row are solder bonded to contact pads on a printed circuit board. One common procedure utilized consists of moving heated rams and an interposed nonsolder wettable spring blade holddown onto a row of presoldered leads to reflow the solder, whereafter the heated ram is withdrawn while the holddown acts to hold the leads while the solder solidifies.

Other solder reflow procedures, such as shown in U.S. Pat. No. 4,306,674, issued Dec. 22, 1981 to J. L. Charles, et al., include passing an assemblage of first and second elements and interposed solder through a nip of a first pair of heating rollers and then through a nip of a second pair of cooling rollers. In this apparatus the first rollers press and heat the solder, and the second rollers act to hold and cool the articles while the solder solidifies. In another procedure, such as shown in U.S. Pat. No. 3,941,292, issued Mar. 2, 1976 to A. A. Osipov, flat presoldered leads of a microcircuit are bonded to sites on a printed circuit board by relatively displacing the board with respect to a heated soldering element which individually engages each of a succession of leads to effectuate a reflow of the solder so that each succeeding engaged lead is solder bonded to the circuit board.

In these prior procedures, contact must be maintained between the presoldered elements and the heating elements for a sufficient time to enable solder to be heated to the required melting temperature, thus substantially limiting the speed of operation. In order to increase the speed of operation of these types of prior art devices, it is necessary to contact the presoldered elements with heating elements that are heated well above the temperature required to melt the solder to insure the application of sufficient heat during a relatively short period of contact with the presoldered elements. Use of such high temperatures, often results in an increase in damage due to thermal shock or damage to heat sensitive components mounted at other adjacent areas on the circuit board.

SUMMARY OF THE INVENTION

This invention contemplates among other things, a conveyor system for rapidly advancing a succession of presoldered articles along a first elongated heating bar to gradually preheat and then melt the solder, whereafter the articles are moved along a relatively long cooling bar to complete the solidification of the solder.

More particularly, a chain conveyor is provided with spring clip workholders for receiving circuit modules having presoldered leads arrayed in a row that are to be solder bonded to contact pads formed on a circuit board. The conveyor, operating at high speeds, advances each circuit module to slide each row of presoldered leads along a relatively long heated bar to gradually heat and melt the solder. During the movement of the presoldered leads along the heating bar, the modules are forceably held against the bar to ensure a maximum transfer of heat to presoldered leads. The heated leads with the melted presolder are next advanced over a short insulating bar and then onto a relatively long cooling bar where the soldered elements are held against the cooling bar to ensure a gradual cooling and final solidification of the solder.

It should be noted that with the relatively long runs along the heating bar the conveyor can be operated at very high speeds and yet the individual presoldered leads will be held in engagement with the heated bar for sufficient time to enable the gradual heating of the leads to temperatures which need only be slightly above the melting temperature of the solder. Further, with the long run along the cooling bar, the rapidly moving leads are gradually cooled without the introduction of thermal shock which may affect the integrity of the solder bonds.

BRIEF DESCRIPTION OF THE DRAWINGS

Other features and advantages of the invention will be apparent upon consideration of the following detailed description when considered in conjunction with the accompanying drawings wherein:

FIG. 1 is a perspective view of an apparatus for reflowing solder on parts moved by a conveyor along a heated rail embodying the principals of the invention;

FIG. 2 is an enlarged perspective view of a section of the conveyor and a workholder for holding parts that are coated with solder that is to be reflowed;

FIG. 3 is a partial side view of an adjustable mounting for a roller over which a resilient belt passes to press the presoldered parts against the heated rail; and FIG. 4 is a partial cross-sectional view of the apparatus shown in FIG. 1 modified to include an added embodiment of the invention.

DETAILED DESCRIPTION OF THE DRAWING

Referring to FIG. 2, there is shown an article 10 having component parts, one or more of which are precoated with solder and which are to be solder bonded by reflowing the solder, utilizing the method and apparatus of the invention. In the illustrated embodiment, the article is a printed circuit board connector which includes a printed circuit board 11 seated within a socket connector housing 12 and the parts to be soldered are terminal leads 13 projecting from the housing to overlay a row of metallic contact pads 14 formed on the circuit board. The leads 13 extend to overlay contact pads formed on both the upper and lower side of the circuit board and the description will be confined to a consideration of a reflow of the solder on the terminals and pads on the underside of the board. The presolder can be placed on either or both the pads and the leads.

Individual circuit board connectors are loaded into a series of conveyor carriers 16, each consisting of a block 17 recessed to receive the connector housing 12. A spring metal leaf clip 18 is secured to the block and overlays the recess to resiliently hold a circuit board housing pressed into the recess. A chain conveyor, such as designated by the reference numeral 21, for advancing a series of carriers 16 is further disclosed in copending application, Ser. No. 481,088, filed Apr. 31, 1983, in the names of W. C. Kent and C. H. Payne. As described in that patent application, the carriers 16 are secured to pins projecting from the chain conveyor 21. In the drawing only one carrier 16 is shown, but it is to be understood that a number of carriers are secured to and advanced by the chain.

The chain advances each carrier 16 to a solder reflow apparatus 23 wherein the presoldered parts are heated to subsequently melt, cool and solidify the solder to solder bond the leads 13 to the contact pads. The solder reflow apparatus 23 includes a block 24 constructed of heat conductive material that is heated by an adjustable cartridge heater generally designated by the reference numeral 26. Mounted within an edge slot formed in the block is a first bar or rail 28 fabricated from a good heat conductive material such as copper. An upper surface of the first bar is coated or furnished with a layer or strip of nonsolder wettable material such as titanium carbonitride. The heater 26 is adjusted so that sufficient heat appears on the upper surface 29 of the bar 28 to enable sufficient heat to be transferred to the presoldered leads 13 to melt and reflow the solder. It will be noted that the bar 28 is relatively long so that the printed circuit board connector 10 may be advanced at a very rapid rate of speed, but the solder coated elements will be held in engagement with the heated surface of the bar for a period sufficient to impart enough heat to melt and reflow the solder. With this arrangement and operation, high temperatures are not encountered that would possibly damage heat sensitive components (not shown) mounted on the circuit board 11.

The carriers 16 move the printed circuit boards 11 exiting from the first bar 28 onto a second or cooling bar 31 which again is constructed of a good heat conductive material. The upper surface of the rail 31 is also coated with a nonsolder wettable material such as used to coat the upper surface 29 of the rail 28. The bar 31 is mounted within an edge slot formed in a cooling block 32 which may be provided with fins (not shown) so that the block acts as a heat sink. In the alternative, as shown in the drawing, the block 32 is provided with passageways 33 for receiving and circulating a cooling fluid. The cooling block 32 and the rail 31 are effective to dissipate the heat of the molten solder to such an extent that the reflowed solder is gradually cooled to avoid thermal shock and is completely solidified prior to the exiting of the circuit board from engagement with the rail 31. Interposed between the blocks 24 and 32 is a barrier 36 formed of insulating material such as G7 commercial grade CP 130 Phenolic available from Synthane Taylor Company, Valley Forge, Pa. The insulating barrier is shaped to provide a short rail section 37. The insulating material used to form the barrier is of a nonsolder wettable type, and hence, the melted solder on the printed circuit board exiting from the heated rail will not be drawn from the solder joint onto the insulator rail section 37.

A guide rail 41 is mounted on the blocks 24 and 32 and functions to engage and guide the outer edge of the moving circuit boards 11. As described in the aforeidentified copending application to Kent and Payne, the chain 21 may be tilted as the circuit boards approach the rails 28 and 41 so that each circuit board initially engages the rail 41 and is then tilted into engagement with the top surface 29 of the rail 28 so that the boards slide in a horizontal plane along both rails.

In order to ensure circuit board movement in the horizontal plane and a good, but light, contact of the leads 13 with the heating and cooling rails 29 and 31, a board engaging and pressing means 43 is provided. This pressing means includes a continuous belt 44 of nonsolder wettable resilient material mounted to travel about a train of holddown rollers 46-1 to 46-N. A leading roller 46-1 is secured to one end of a shaft 48 having a sprocket 49 mounted on the other end. The teeth of the sprocket 49 are engaged and driven by chain link couplings 50 so that the belt 44 is driven at the same speed as the conveyor chain and the circuit boards 11 thus obviating any scraping movement between the belt and the advancing circuit boards.

As shown in FIGS. 1 and 4, the shaft 48 is rotatably mounted in a bearing 51 fitted in a support beam 52 that in turn is supported by bolts 53 extending from a fixed frame member 54. The threaded lower portions of the bolts are seated in the beam 52 while unthreaded shank portions of the bolts extend through bores formed in the frame 54. The other rollers 46-2 to 46-N are similarly mounted on stud shafts 55 extending from the beam 52. Surrounding each bolt 53 and interposed between the beam 52 and the frame 54 is a compressed spring 56 which acts to press the beam 52 to push the belt 44 into firm engagement with the advancing circuit boards thereby insuring that the circuit boards slide in a horizontal plane and that the terminal leads 13 contact the rails 28 and 31. The bolts 53 may be adjusted to vary the press force imparted by the belt to the advancing boards so that the force imparted to the board is only enough to ensure a light but firm contact between the terminal leads and contact pads on the underside of the circuit board.

Facilities are provided to tension the belt 44 (see FIGS. 1 and 3). These facilities may include a beam section 61 detached from the beam 52 but connected thereto by a series of bolts 62. The bolts have threaded ends seated within the end of the beam 52 and unthreaded shanks slideably mounted in bores formed in the beam section 61. The last roller 46-N is rotatably mounted on a stud shaft 63 which is secured to the beam section 61. Interposed between the rear face of the beam 52 and the front face of the beam section 61 are springs 66, coaxially positioned about the bolt shanks, acting to push the beam section 61 and roller 46-N away from the beam 52 to thus tension the belt 44. By turning the bolts 62, the position of the beam section 61 is adjusted to accordingly regulate the tension imparted to the belt 44.

Referring now to FIG. 4, for a consideration of a further embodiment of the invention, there is shown a connector 71 having two rows of contact pads 72 and 73 which are overlaid with presoldered terminal leads 74 and 76 emanating from connector housings 77 and 78. The reflow soldering apparatus of FIG. 1 is modified as shown in FIG. 3 by replacing the guide rail 41 with a second reflow soldering rail 79 which is substantially identical in construction with the rail sections 28, 37, and 31. In this instance, the circuit boards will be advanced by the conveyor 21 onto the rails 79 and 28 where the solder on both sets of presoldered leads 74 and 76 are melted and then cooled. Again, the belt 44 is utilized to press the board 11 so that both sets of terminal leads 74 and 76 are firmly engaged with and slide along the respective rails 28 and 79.

It may be appreciated that the method and apparatus of the present invention may be utilized to solder bond many other types of articles. As an example, two strips of metal, having a continuous stripe of solder or stripes of solder interposed between overlapping edges of the metal strips, may be mounted in suitable holders and advanced along the heating and cooling rails at very high rates of speed to solder bond the overlapping sections of the metal strips.

What is claimed is:

1. An apparatus for reflowing solder coated on one of a pair of abutting elements, which comprises:
   a first heat conductive rail;
   means for heating said first rail to a temperature slightly above the melting temperature of the solder;
   a second heat conductive rail aligned with said first rail;
   means for maintaining the temperature of the second rail below the melting temperature of the solder; and
   means for engaging and sliding said elements along said first and second rails at a speed that allows the solder to melt during movement of said elements along the heated rail and allows the solder to cool and solidify during movement of said elements along said second rail.

2. An apparatus as defined in claim 1, which comprises:
   means for pressing the elements into engagement with said first and second rails.

3. An apparatus as defined in claim 2, which comprises:
   means for advancing the pressing means at the same speed that the elements are slid along said first and second rails.

4. An apparatus as defined in claim 1, which comprises:
   an insulator rail section interposed between the first rail and the second rail.

5. An apparatus as defined in claim 2 wherein in the pressing means is an endless belt of nonsolder wettable material, and which comprises:
   means interconnecting the element sliding means and the belt for advancing the pressing means at the same speed that the elements are slid along said first and second rails.

6. An apparatus as defined in claim 1 which comprises:
   a first heat conductive block means for mounting and heating said first rail;
   a second heat conductive block means for mounting and cooling said second rail;
   a second heating rail mounted on said first heat conductive block for engaging, heating and melting solder on a second row of presoldered abutting elements; and
   a second cooling rail mounted on said second heat conductive block for engaging and cooling the second row of presoldered elements to solidify the molten solder on said elements.

7. An apparatus for reflowing solder on a row of presoldered leads overlaying sites on printed circuit boards which comprises:
   an aligned arrangement of first, second and third abutting bars each constructed with a surface of nonsolder wettable material, said first and third bars being relatively long with respect to the interposed second bar;
   a conveyor having a series of workholders for receiving and moving a succession of printed circuit boards to slide the presoldered leads along said non-solder wettable surfaces of said first, second and third bars;
   means for heating the first bar to a temperature slightly above that necessary to melt the solder on the leads;
   said interposed second bar being constructed of heat insulating material; and
   means for cooling the third bar to a temperature to gradually cool the heated leads exiting from the second bar to reduce thermal shock induced during solidification of the solder.

8. A method of reflowing a strip of solder interposed between elements, which comprises;
   heating a first rail to a temperature slightly above the melting temperature of the solder;
   advancing the elements at a predetermined speed to slide the elements along the first rail to gradually heat the elements and interposed solder above the melting temperature of the solder as the elements exit from engagement with the first rail;
   advancing the elements from the first rail onto a second rail aligned with said first rail to slide said elements along said second rail; and
   cooling said second rail aligned with the first rail to gradually cool the elements and the solder to solidify the solder as the elements slide along the second rail.

9. A method as defined in claim 8 wherein the elements are a row of terminal leads overlaying a row of contact pads on a printed circuit board and the strip of solder comprises presolder coatings on the leads, and comprises:
   applying a pressing force to the advancing circuit board to hold the leads against the first and second rails.

10. A method as defined in claim 9, which comprises: advancing the board to move the leads along a surface of an insulating rail interposed between the heating and cooling rail.

11. A method as defined in claim 9, which comprises:
   mounting the circuit board in a carrier advanced by a conveyor so that leads ride along the first and second rails;
   and
   moving the applied pressing force at the same speed as the speed of the leads sliding along the rails.

12. A method as defined in claim 9 for soldering a second row of presoldered terminal leads to a second row of contact pads on the circuit board, which comprises:
   simultaneously advancing the second row of presoldered leads along a second heated rail to heat the presoldered leads to melting temperature of the solder as the leads exit the second heated bar; and
   simultaneously advancing the second row of terminals along a second cooling rail to solidify the solder.

* * * * *